US008152029B2

(12) United States Patent
Tuyls et al.

(10) Patent No.: US 8,152,029 B2
(45) Date of Patent: Apr. 10, 2012

(54) PUMP DISPENSER WITH BYPASS BACK FLOW

(75) Inventors: James M. Tuyls, Vacaville, CA (US); Thomas R. Hecht, Winters, CA (US); Juha K. Salmela, Citrus Heights, CA (US)

(73) Assignee: Hynix Semiconductor Inc., Icheon-si (KR)

( * ) Notice: Subject to any disclaimer, the term of this patent is extended or adjusted under 35 U.S.C. 154(b) by 648 days.

(21) Appl. No.: 11/868,171

(22) Filed: Oct. 5, 2007

(65) Prior Publication Data

US 2009/0090747 A1 Apr. 9, 2009

(51) Int. Cl.
*G01F 11/00* (2006.01)

(52) U.S. Cl. ........................................ 222/318; 222/385

(58) Field of Classification Search .................. 222/318, 222/372, 385; 417/285, 489
See application file for complete search history.

(56) References Cited

U.S. PATENT DOCUMENTS

| | | | | |
|---|---|---|---|---|
| 480,068 | A * | 8/1892 | Bullard | 222/385 |
| 1,698,632 | A * | 1/1929 | Jaden | 222/385 |
| 1,919,173 | A * | 7/1933 | Schutt | 222/385 |
| 2,022,208 | A | 11/1935 | Lacke | |
| 2,183,370 | A | 12/1939 | Selitzky | |
| 2,205,875 | A * | 6/1940 | Coffey et al. | 222/309 |
| 2,408,009 | A * | 9/1946 | Titus | 417/466 |
| 2,681,009 | A * | 6/1954 | Titus | 417/460 |
| 2,739,739 | A * | 3/1956 | Steele | 222/243 |
| 2,811,284 | A * | 10/1957 | Rogers | 222/173 |
| 2,837,246 | A | 6/1958 | Steele | |
| 3,191,807 | A * | 6/1965 | Rodrigues, Jr. | 222/49 |
| 3,332,585 | A * | 7/1967 | Cox | 222/309 |
| 4,035,109 | A * | 7/1977 | Drath et al. | 417/403 |
| 5,297,399 | A | 3/1994 | Tieken | |
| 5,375,746 | A * | 12/1994 | Schaefer et al. | 222/385 |
| 5,579,959 | A * | 12/1996 | Bennett et al. | 222/385 |
| 6,019,256 | A | 2/2000 | Seltzer | |
| 6,405,897 | B1 | 6/2002 | Jepson et al. | |
| 6,450,373 | B1 | 9/2002 | Seltzer | |

* cited by examiner

*Primary Examiner* — Kevin P Shaver
*Assistant Examiner* — Daniel R Shearer
(74) *Attorney, Agent, or Firm* — Kilpatrick Townsend & Stockton LLP

(57) ABSTRACT

A dispensing apparatus is disclosed. The dispensing apparatus has a product container for holding the fluid; a chamber including a dispensing cylinder having an inlet and an outlet; an inlet check valve disposed at the inlet of the chamber, the inlet check valve being openable to permit flow substantially only in a direction through the inlet check valve into the chamber; an outlet check valve disposed at the outlet of the chamber, the outlet check valve being openable to permit flow substantially only in a direction from the chamber out through the outlet check valve; an outlet spout connected with the outlet of the outlet check valve for receiving the fluid from the outlet check valve; a spring-biased piston configured for sliding movement in the dispensing cylinder, the piston being smaller than the dispensing cylinder thus providing a clearance; and a bypass backflow opening disposed in the dispensing cylinder above the spring-biased piston. The clearance is provided between the piston and the dispenser cylinder wall to allow fluid flow to pass therebetween to a region above the piston when the piston is pushed downward and, subsequently, to allow fluid flow to exit the dispenser chamber from the region above the piston through the bypass back flow opening to the product container.

19 Claims, 1 Drawing Sheet

PUMP DISPENSER WITH BYPASS BACK FLOW

BACKGROUND OF THE INVENTION

The present invention relates generally to dispensing systems, and more particularly to a pump for dispensing gravies, sauces, condiments, beverages, and the like.

It is often desirable to dispense a gravy, a sauce, a condiment, a beverage, or the like by way of a simple pump. Both mechanical and electronic devices have been used for such purposes. Such pumps typically dispense fluids that include particulate matter, which causes friction and damage to the piston and the dispenser chamber wall caused by trapped particulates. Furthermore, such pumps, much like most pumps are typically designed to include a seal between piston and the cylinder walls of a dispensing chamber. The trapped particulate matter and the ever present friction tend to also damage such seals. Many such dispensing systems are known. Some of the devices are rather complex and expensive. Some may be difficult to clean and maintain. All suffer from the above shortcomings.

BRIEF SUMMARY OF THE INVENTION

The present invention provides a dispensing apparatus, having a product container for holding the fluid; a chamber including a dispensing cylinder having an inlet and an outlet; an inlet check valve disposed at the inlet of the chamber, the inlet check valve being openable to permit flow substantially only in a direction through the inlet check valve into the chamber; an outlet check valve disposed at the outlet of the chamber, the outlet check valve being openable to permit flow substantially only in a direction from the chamber out through the outlet check valve; an outlet spout connected with the outlet of the outlet check valve for receiving the fluid from the outlet check valve; a spring-biased piston configured for sliding movement in the dispensing cylinder, the piston being smaller than the dispensing cylinder thus providing a clearance; and a bypass backflow opening disposed in the dispensing cylinder above the spring-biased piston. The clearance is provided between the piston and the dispenser cylinder wall to allow fluid flow to pass therebetween to a region above the piston when the piston is pushed downward and, subsequently, to allow fluid flow to exit the dispenser chamber from the region above the piston through the bypass back flow opening to the product container.

In one aspect, the piston slideably engages the dispensing cylinder in the absence of a piston seal between the piston and the dispensing cylinder.

In another aspect, the bypass backflow opening is configured to be located above the level of the fluid in the product container.

In another aspect, the bypass backflow opening is one of plurality of bypass openings radially disposed about the dispensing cylinder.

In another aspect, a pushing down action on the spring-biased piston results in a pushing of the fluid from the dispensing cylinder toward the outlet spout. And when the piston moves upward, the inlet check valve is opened and the outlet check valve is closed to draw fluid from the product container into the dispensing cylinder.

In another aspect, the clearance is sized to be larger than the largest particulate contained in the fluid. And, when the fluid does not contain any particulates, the clearance is selected based on the viscosity of the fluid. The clearance is selected such that a larger clearance is used for a higher viscosity fluid.

In another aspect, the dispensing apparatus also has a shaft connected at its distal end with the piston and connected at its proximal end with a plunger cap. Furthermore, a shaft seal is disposed near the distal end of the shaft and above the piston. The shaft seal provides a seal between the shaft and a sleeve disposed around the shaft. In addition, a spring is provided and maintained between the plunger cap and the piston.

In another aspect, the inlet check valve has an inlet check valve closure member biased toward an inlet opening to close the inlet opening. The closure member can be a ball held against the inlet opening by the force of gravity. The inlet check valve can be a ball check valve.

In another aspect, the outlet check valve has an outlet check valve closure member biased toward an outlet opening to close the outlet opening. The closure member can be a ball held against the outlet opening by the force of gravity.

In another aspect, the top portion of the product container is sized to hold the outlet spout and the chamber in position such that the inlet check valve is maintained a set distance above the interior bottom of the product container.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

DETAILED DESCRIPTION OF THE INVENTION

Figures 1, 1A:
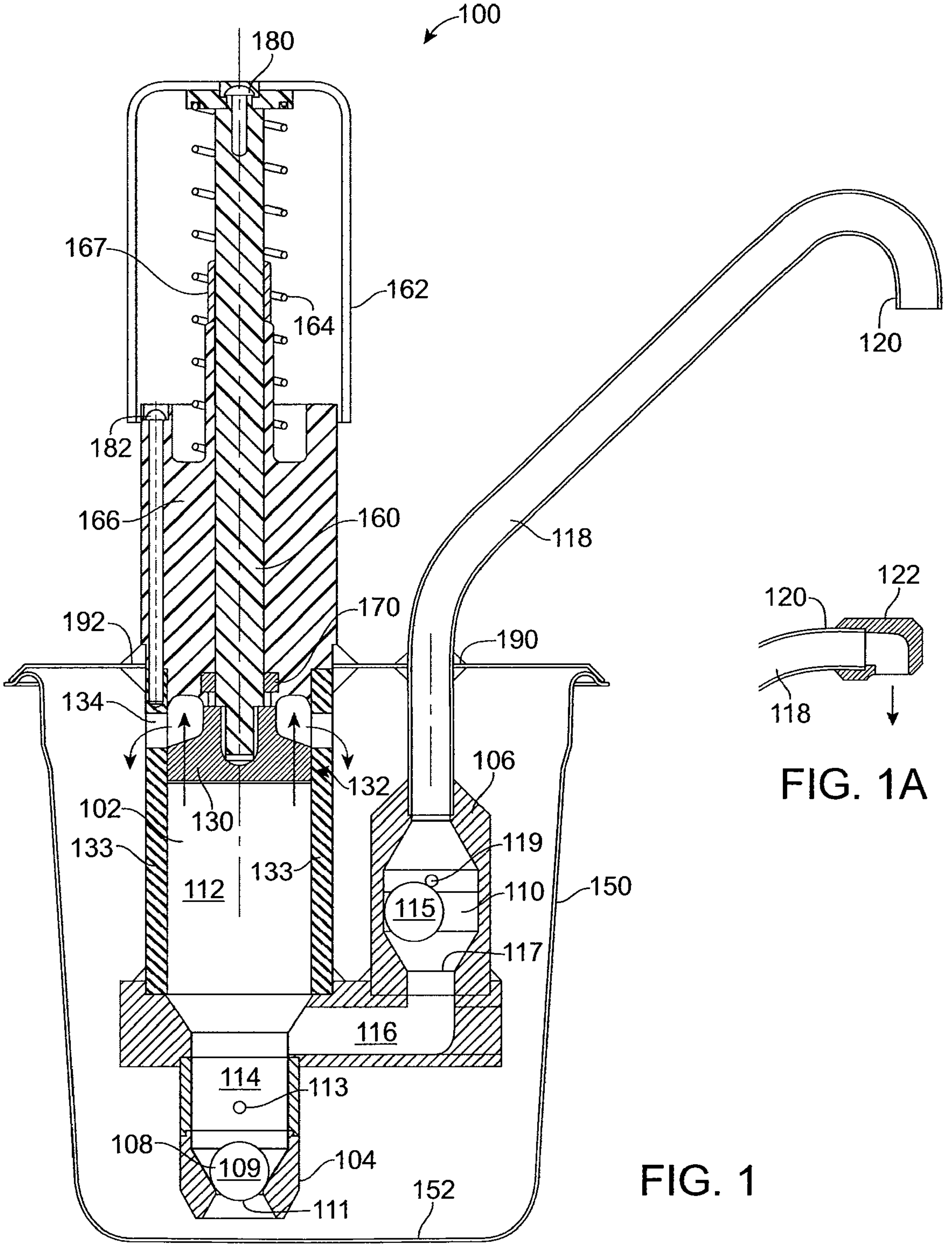
FIG. 1 is a simplified exemplary diagram illustrating the dispensing system in accordance with an embodiment of the present invention.
FIG. 1A illustrates a detail for a dispensing outlet fitting for the system of FIG. 1.

FIG. 1 shows a simplified exemplary diagram of the dispensing system or a pump 100 for dispensing gravies, sauces, condiments, beverages, and the like, in accordance with an embodiment of the present invention. The pump 100 includes dispensing chamber 102 having a cylindrical portion with an inlet 104 and an outlet 106. An inlet check valve 108 is disposed at the inlet 104; and an outlet check valve 110 is disposed at the outlet 106. As discussed in more detail below, the inlet check valve 108 and outlet check valve 110 control the fluid flow through the pump 100.

The inlet 104 is connected to the dispensing chamber 112 via a inlet passage 114. The dispensing chamber 112 is connected with the outlet 106 via an outlet passage 116. The outlet 106 is connected to an outlet tube or spout 118 having a distal end 120. As is shown in FIGS. 1 and 1A the distal end 120 is oriented in a downward direction to dispense the pumped fluid in a downward direction. As is shown in FIG. 1A, the distal end 120 can optionally include a dispensing outlet fitting 122, which when fitted to the horizontal distal end of the spout 118, will add a 90 degree bend to direct the pumped fluid in a downward direction.

A spring-biased piston 130 is configured for sliding movement in the dispensing cylinder 112. The piston 130 is smaller in diameter than the dispensing cylinder 112 thus forming a clearance 132. The pump 100 also includes a bypass backflow opening 134 disposed in the dispensing cylinder wall 133 above the spring-biased piston 130. The clearance 132 is provided between the piston 130 and the dispenser cylinder wall 133 to allow fluid flow to pass therebetween to a region above the piston 130 when the piston is pushed downward and, subsequently, to allow fluid flow to exit the dispenser chamber 112 from the region above the piston 130 through the bypass back flow opening 134 to the product container 150.

The pump 100 is operated by pushing down on a spring-biased piston 130 to push fluid in the dispenser chamber 112 to the dispenser outlet 106, 118, 120. When the piston moves 130 downward, the first or inlet check valve 108 is closed and the second or outlet check valve 110 is opened to allow fluid flow from the dispenser chamber 112 to the dispenser outlet 106, 118, 120. When the piston moves 130 upward, the first or inlet check valve 108 is opened and the second or outlet check valve 110 is closed to draw fluid from the product container 150 into the dispenser chamber 112.

The clearance 132 has a size that is larger than the largest particulate contained in the fluid. When the fluid does not contain any particulates, the clearance is selected based on the viscosity of the fluid (the higher the viscosity, the larger the clearance will be). An advantage of the dispensing system in accordance with the embodiments of the present invention is that it no longer uses a seal between the piston and the dispenser chamber wall. The novel and inventive dispensing system can reduces friction and damage to the piston and dispenser chamber wall caused by trapped particulates.

The inlet valve 108 and outlet valve 110 desirably are check valves that automatically open and close as a result of the movement of the fluid through the chamber 112. As shown in FIG. 1 the inlet valve 108 includes an inlet valve closure member such as an inlet ball 109 which is movable between an inlet opening 111 and an inlet ball keeper 113. In this embodiment, the inlet ball 109 is disposed above the inlet opening 111, and the inlet ball keeper 113 is spaced above the inlet opening 111. The inlet ball 109 is constrained to move generally vertically between the inlet opening 111 and the inlet ball keeper 113. The outlet valve 110 includes an outlet valve closure member such as an outlet ball 115 which is movable between an outlet opening 117 and an outlet ball keeper 119. In the embodiment shown, the outlet ball keeper 119 is generally vertically spaced from the outlet opening 117. The outlet ball 115 is constrained to move generally vertically between the outlet opening 117 and the outlet ball keeper 119.

How quickly the inlet ball 109 moves to the open position depends largely on the viscosity of the fluid and the weight of the inlet ball 109, as well as on how fast the pressure drop occurs in the chamber 112. Typically, the higher the viscosity, the heavier is the ball 109. It is understood that to achieve the desired check valve action, the appropriate ball weight can be selected for a given type of fluid, and chamber size and configuration, which determine the suction force during the opening of the inlet check valve 108.

How quickly the outlet ball 115 moves to the open position depends largely on the viscosity of the fluid and the weight of the outlet ball 115, as well as on how fast the pressure rise occurs. Typically, the higher the viscosity, the heavier is the ball 115. It is understood that to achieve the desired check valve action, the appropriate ball weight can be selected for a given type of fluid, and chamber size and configuration, which determine the discharge force during the opening of the outlet check valve 110.

The piston 130 is connected to shaft 160. Shaft 160 is connected with plunger cap 162. Spring 164 is held against the plunger cap 162 and the sleeve 166 to provide the bias against the piston 130. In operation, the plunger cap 162 is pushed downward manually to the bottom position for dispensing fluid from the chamber cavity 112. Upon release of the downward force, the spring 164 moves the plunger cap 162, and the shaft 160 and the piston 130 upward and automatically returns it to the top position for filling the cavity 112. The plunger cap 162 is constrained to move between the top and bottom positions to produce a uniform change in the size of the cavity 112 and hence portion control of the amount of fluid dispensed. The pump 100 provides a simple mechanism for reliably providing consistent portion control dispensing operation.

The movement of the plunger cap 162 is controlled in part by the spring 164. The stroke of the plunger cap may be limited by the top interior surface of the plunger cap 162 making contact with the top portion of the sleeve 166 as the cap 162 is brought down. The stroke of the pump may also be set by adjusting the length of the sleeve 166 which limits the downward movement of the plunger cap 162 as it runs against the body of the pump. It is possible to replace the sleeve 166 and shaft 160 with a sleeve 166 and shaft 160 having a desired length to adjust the plunger stroke and adapt the pump to achieve the desired pumping for a particular fluid under specified operating conditions. The replacement of the housing sleeve 166 and shaft 160 is relatively simple and quick by loosening and applying fasteners 180, 182 used to connect the plunger cap to the shaft 160 and the sleeve to the container 150, respectively. The stroke of the pump may also be set by placing a spacer 167 on top of the sleeve 166 to limit the stroke of the piston for a smaller portion if so desired.

A shaft seal 170 is used to seal the shaft 160 with respect to the sleeve 166 so as to prevent the dispensed fluid that travels upward through the clearance 132 from getting into the space between the shaft 160 and the sleeve 166.

The components of the pump 100 may be made by any suitable methods, including injection molding. The components may be made from food grade materials such as food grade acrylics, or food grade acetals. The pump configuration lends itself to a clean-in-place process whereby a cleaning fluid can be flowed through the pump 100 for cleaning without disassembly. The cleaning fluid enters the inlet 104, passes through the chamber cavity 112, and exits the outlet 120, cleaning all surfaces that have been exposed to the gravy, sauce condiment, beverage, or the like.

In operation, the gravy, sauce, condiment, beverage, or the like is poured into the container 150 with the inlet 104 of the pump 100 immersed into the product. The top portions 190, 192 of the container 150 (e.g. lid) are dimensioned to hold the pump at the proper level and orientation with respect to the container 150, ensuring that inlet 104 is held above the bottom of the container 152 thus allowing the fluid product to enter into the chamber 112.

The above description is illustrative and is not restrictive, and as it will become apparent to those skilled in the art upon review of the disclosure, that the present invention may be embodied in other specific forms without departing from the essential characteristics thereof. These other embodiments are intended to be included within the spirit and scope of the present invention. The scope of the invention should, therefore, be determined not with reference to the above description, but instead should be determined with reference to the following and pending claims along with their full scope of equivalents.

What is claimed is:

1. A dispensing apparatus, comprising:

a product container for holding a fluid;

a chamber including a dispensing cylinder having an inlet and an outlet;

an inlet check valve disposed at the inlet of the chamber, the inlet check valve being openable to permit flow substantially only in a direction through the inlet check valve into the chamber;

an outlet check valve disposed at the outlet of the chamber, the outlet check valve being openable to permit flow substantially only in a direction from the chamber out through the outlet check valve;

an outlet spout connected with said outlet of said outlet check valve for receiving the fluid from said outlet check valve;

a spring-biased piston configured for sliding movement in said dispensing cylinder, said piston being smaller than said dispensing cylinder thus providing a clearance; and a bypass backflow opening disposed in said dispensing cylinder above said spring-biased piston, the clearance being small enough such that fluid within the dispensing cylinder is pushed out of the dispensing cylinder through the outlet check valve during a downward stroke of the piston and is at least one of selected based on the viscosity of the fluid or larger than a largest particulate contained in the fluid, said clearance being provided between said piston and said dispenser cylinder wall to allow fluid flow to pass therebetween from below the piston to a region above the piston at all positions of the piston within the dispensing cylinder during an entire downward stroke of the piston and, subsequently, to allow fluid flow to exit the dispenser chamber from the region above the piston through the bypass back flow opening to the product container during an upward stroke of the piston, wherein when the piston is disposed at the top of the piston's stroke within the dispensing cylinder a cavity is formed within the dispensing cylinder and above the piston, and the piston having a top surface that slopes downward toward the bypass backflow opening to direct any of the fluid resident in the cavity towards the bypass backflow opening.

2. The dispensing apparatus of claim 1, wherein said piston slideably engages said dispensing cylinder in the absence of a piston seal between said piston and said dispensing cylinder.

3. The dispensing apparatus of claim 1, wherein said bypass backflow opening is configured to be located above the level of the fluid in said product container.

4. The dispensing apparatus of claim 1, wherein said bypass backflow opening is one of plurality of bypass openings radially disposed about said dispensing cylinder.

5. The dispensing apparatus of claim 1, wherein a pushing down action on said spring-biased piston results in a pushing of the fluid from said dispensing cylinder toward said outlet spout.

6. The dispensing apparatus of claim 1, wherein when said piston moves upward, said inlet check valve is opened and said outlet check valve is closed to draw fluid from said product container into said dispensing cylinder.

7. The dispensing apparatus of claim 1, wherein said clearance is sized to be larger than the largest particulate contained in the fluid.

8. The dispensing apparatus of claim 1, wherein when the fluid does not contain any particulates, said clearance is selected based on the viscosity of the fluid.

9. The dispensing apparatus of claim 8, wherein said clearance is selected such that a larger clearance is used for a higher viscosity fluid.

10. The dispensing apparatus of claim 1, further comprising a shaft connected at its distal end with said piston and connected at its proximal end with a plunger cap.

11. The dispensing apparatus of claim 10, further comprising a shaft seal disposed near said distal end of said shaft and above said piston, said shaft seal providing a seal between said shaft and a sleeve disposed around said shaft.

12. The dispensing apparatus of claim 10, further comprising a spring maintained between said plunger cap and said piston.

13. The dispensing apparatus of claim 1, wherein said inlet check valve comprises an inlet check valve closure member that interfaces with an inlet opening to close the inlet opening.

14. The dispensing apparatus of claim 13, wherein said closure member is a ball held against the inlet opening by the force of gravity.

15. The dispensing apparatus of claim 1, wherein said inlet check valve is a ball check valve.

16. The dispensing apparatus of claim 1, wherein said outlet check valve comprises an outlet check valve closure member that interfaces with an outlet opening to close the outlet opening.

17. The dispensing apparatus of claim 16, wherein said closure member is a ball held against the outlet opening by the force of gravity.

18. The dispensing apparatus of claim 1, wherein a top portion of said product container is sized to hold said outlet spout and said chamber in position such that the inlet check valve is maintained a set distance above the interior bottom of said product container.

19. The dispensing apparatus of claim 1, wherein the sloping top surface of the piston is positioned to allow all of any fluid resident in the cavity to flow through the bypass backflow opening when the piston is disposed at the top of the piston's stroke within the dispensing cylinder.

* * * * *

UNITED STATES PATENT AND TRADEMARK OFFICE

CERTIFICATE OF CORRECTION

PATENT NO. : 8,152,029 B2
APPLICATION NO. : 11/868171
DATED : April 10, 2012
INVENTOR(S) : James M. Tuyls et al.

It is certified that error appears in the above-identified patent and that said Letters Patent is hereby corrected as shown below:

ON THE TITLE PAGE:

Item (73) in the Assignee section, please delete “Hynix Semiconductor Inc., Icheon-si (KR)” and insert --Automatic Bar Controls, Inc., Vacaville, CA--

Signed and Sealed this
Twenty-first Day of August, 2012

David J. Kappos

David J. Kappos
*Director of the United States Patent and Trademark Office*